US012682788B2

(12) United States Patent
Schwemmer et al.

(10) Patent No.: US 12,682,788 B2
(45) Date of Patent: Jul. 14, 2026

(54) COATING AGENT AND ITS USE, AND METHOD OF PRODUCING ARTICLES FOR THIS USE

(71) Applicant: STAEDTLER SE, Nuremberg (DE)

(72) Inventors: Judith Schwemmer, Happurg (DE); Mathias Belzner, Cadolzburg (DE); Arthur Prior, London (GB)

(73) Assignee: STAEDTLER SE, Nuremberg (DE)

( * ) Notice: Subject to any disclaimer, the term of this patent is extended or adjusted under 35 U.S.C. 154(b) by 553 days.

(21) Appl. No.: 18/029,193

(22) PCT Filed: Oct. 5, 2021

(86) PCT No.: PCT/EP2021/025382
§ 371 (c)(1),
(2) Date: Mar. 29, 2023

(87) PCT Pub. No.: WO2022/073637
PCT Pub. Date: Apr. 14, 2022

(65) Prior Publication Data
US 2023/0368703 A1 Nov. 16, 2023

(30) Foreign Application Priority Data
Oct. 8, 2020 (DE) ...................... 10 2020 006 176.1

(51) Int. Cl.
*C09D 191/08* (2006.01)
*C09D 5/00* (2006.01)
*G09B 25/02* (2006.01)

(52) U.S. Cl.
CPC ............. *G09B 25/02* (2013.01); *C09D 5/002* (2013.01); *C09D 191/08* (2013.01)

(58) Field of Classification Search
CPC .... C09D 5/002; C09D 191/06; C09D 191/08; G09B 25/02

USPC ........................................................ 106/270
See application file for complete search history.

(56) References Cited

U.S. PATENT DOCUMENTS

| | | | |
|---|---|---|---|
| 6,837,924 B2 | 1/2005 | Breindl | |
| 2003/0131758 A1* | 7/2003 | Breindl ................ | C08K 5/0041 |
| | | | 106/271 |
| 2007/0100052 A1* | 5/2007 | Terry Lee ............... | C08L 91/00 |
| | | | 524/451 |
| 2010/0062200 A1* | 3/2010 | Domes ..................... | B05D 3/02 |
| | | | 428/35.8 |
| 2019/0134846 A1 | 5/2019 | Tartler | |

FOREIGN PATENT DOCUMENTS

| | | |
|---|---|---|
| CN | 108676370 A | 10/2018 |
| DE | 69213130 T2 | 4/1997 |
| DE | 29720344 U1 | 2/1998 |
| DE | 29720892 U1 | 2/1998 |
| DE | 102016109816 A1 | 11/2017 |
| EP | 1327533 A2 | 7/2003 |

OTHER PUBLICATIONS

International Search Report of PCT/EP2021/025382 Dated Feb. 11, 2022, 3 Pages.

* cited by examiner

*Primary Examiner* — Laura Martin
(74) *Attorney, Agent, or Firm* — LUCAS & MERCANTI, LLP; Klaus P. Stoffel

(57) ABSTRACT

Main claim: a binder, consisting of at least one wax and optionally additional additives, characterized in that the at least one wax is constituted of at least a base wax portion and a synthetic wax portion and that the melting point of the synthetic wax portion is higher than the melting point of the base wax portion.

3 Claims, No Drawings

COATING AGENT AND ITS USE, AND METHOD OF PRODUCING ARTICLES FOR THIS USE

CROSS-REFERENCE TO RELATED APPLICATIONS

The present application is a 371 of international application PCT/EP2021/025382, filed Oct. 5, 2021, which claims priority of DE 10 2020 006 176.1, filed Oct. 8, 2020, the priority of these applications is hereby claimed and these applications are incorporated herein by reference.

BACKGROUND OF THE INVENTION

The invention relates to a coating agent as well as to its use, and to a method for the production of articles for this use.

Agents/primers for improving the adhesion between a base layer/basic frame and a covering layer over it are known in principle.

What is also known is that in the automobile design process, realistic and true to scale models are produced, inter alia from modelling clay applied to a basic frame. The combination of modelling clay and the basic frame is necessary in this regard in order to obtain a reduction in the weight of the clay model which is formed. In order to obtain a sufficient hold/adhesion between the basic frame and modelling clay, in a first working step, modellers usually initially apply a thin layer of the modelling clay using a great deal of force. It is only in a further working step that the application of the required thicknesses of the layers can be begun—in the modelling or design process, approximately 5 cm in thickness.

When producing models in accordance with the known prior art, the basic frame is pre-treated with a barrier layer such as shellac, for example, in order to bind the dust on the surface of the basic frame, because on the one hand, the dust would contribute to contaminating the modelling clay, and on the other hand, the adhesive force between the clay and basic frame would be reduced.

This problem arises both with the manual application of clay to a basic frame and also in the case of the semi-automatic and/or fully automatic application of clay to the surfaces of a basic frame.

An example which may be mentioned is the semi-automatic application of clay as described in more detail in DE 29720892 U1 and DE 102016109316 A1. The modelling clay is heated and conveyed in the machines which are shown so that can finally be conveyed to an application nozzle in a conveying hose. While the actual application of the industrial clay through a system of this type is made noticeably easier for the modeller, at the same time it has been shown to be disadvantageous because a significant reduction in the adhesion between the modelling clay and the surface of the basic frame has been recorded. With the aid of the semi-automatic application system, the necessary pressure for applying a first thin layer of clay cannot be exerted. The direct consequence of this is that the clay is merely deposited on the surface of the basic frame and therefore the required adhesion is not developed or does not develop.

Furthermore, it has been shown that current conventionally used agents/primers cannot compensate for the missing effort needed in order to produce good adhesion.

SUMMARY AND DESCRIPTION OF THE INVENTION

Thus, the objective of the invention is to provide a coating agent which does not suffer from the disadvantages mentioned. above and in particular ensures a sufficient adhesion between a porous basic frame and industrial clay at the contact surfaces/interfaces.

A further objective of the invention is to use the coating agent in the design process in automotive development.

An additional objective of the invention is to provide a method with which design models can be created in automotive development.

The coating agent in accordance with the invention consists of at least one wax/wax portion as well as other optional additives. The at least one wax portion is present as a base wax portion and a synthetic wax portion.

The coating agent could also be described as a primer. The base wax portion is present as a wax and/or wax blend the melting range of which is between 6000 and 80° C. The melting point of the base wax portion is therefore somewhat below the application temperature/processing temperature of the industrial clay, which is approximately 80° C. It has been shown to be advantageous for the wax and/or wax blend to be present as a microwax and/or paraffin wax. The base wax portion makes up 20 to 70% by weight, preferably 25 to 65% by weight of the coating agent.

In addition, it has surprisingly been shown that a specific effect is obtained because of the combination of the wax and/or wax blend described above, what is known as the base wax portion, with a synthetic wax or synthetic wax blend. In this regard, the synthetic wax portion has a melting point which is greater than/higher than the melting point of the base wax portion.

Examples of synthetic waxes which may be cited are ethylene propylene polymers, polyethylene wax (oxidized polyethylene) and/or polyalphaolefins. The synthetic wax portion is 30 to 80% by weight, preferably 35 to 65% by weight of coating agent.

The combination of the base wax portion with a synthetic wax portion provides the advantage that, after applying the coating agent to the porous basic frame, in the subsequent application, because of the heat introduced by the industrial clay which is at the processing temperature, only fractional melting of the base wax portion occurs in the coating agent. This means that at any point in time, sufficient bonding of the industrial clay to the basic frame is produced by the synthetic wax which has not fused or melted, and therefore no film of lubricant, or only a weak film of lubricant, is generated by the fused base wax portion. Because the base wax portion in the coating agent melts, direct bonding to the industrial clay occurs, which is reflected in an increased adhesion between the basic frame and industrial clay after cooling.

Prior to actually applying the industrial clay to the basic frame, the coating agent is heated and fused and applied to the basic frame over a wide extent or over its entirety, either manually by means of a brush and/or silicone roller, or by machine with a hot wax spray gun. The effect of the improvement in adhesion can be achieved by applying the coating agent manually or by machine. However, surprisingly, it has been shown that when applying by spraying, for example with a hot wax gun, "spiders' webs" of filaments and/or filamentous structures are produced because portions of the wax of the coating agent will already have solidified during the spraying process. An advantage with the filament structure which is formed is that no unwanted aerosols are formed in the ambient air and the user does not have to wear a respiratory mask.

What is important in respect of the steps of the method described herein when producing a design model is that the coating agent cools down prior to the actual application of the industrial clay and therefore it solidifies on the basic frame in order to ensure good adhesion of the industrial clay to the basic frame.

The significant increase in the adhesion can be put down to the fact that because of the heat input by the industrial clay which is applied when hot, a portion of the wax and/or wax portions, in particular the base wax portion, fuses or at least melts, whereupon a directly increased adhesion is produced between components of the industrial clay and basic frame.

By way of example, a semi-automatic method for applying industrial clay by means of a coating machine may be mentioned, by means of which heated industrial clay is conveyed from a storage container via a heated hose system to the application site on the basic frame. Because the coating agent at least partially fuses again during the application process, base waxes and/or base wax blends have to be used which have melting ranges within which the application temperature for the industrial clay is positioned. The application or processing temperature for the industrial clay is 60° C. to 80° C. Microwaxes and/or paraffin waxes, for example, meet this requirement and may be employed.

Because of the combination with a synthetic wax, only fractional melting of the coating agent occurs, because the melting point of the synthetic wax portion is above the processing temperature of the industrial clay. This has the effect that at any point in time during the application of coating agents and/or the method for the production of design models, a sufficient bond with the substrate or the surface of the basic frame is formed because only a very weak film of lubricant is formed by the fused base wax and/or base wax portion.

Furthermore, the synthetic wax portion provides the spiders' web-Like structure when applying using a hot wax gun. If exclusively paraffin and/or microwax were to be used as the coating agent, this would result in a reduced adhesive effect and in addition, an aerosol would be formed in the air during spraying, which would entail taking additional protective measures.

Examples other additives in the coating agent are rheological additives, tackifiers and/or colorants.

Rheological additives can specifically vary the flow behaviour, even at raised temperatures. This is particularly important for the vertical parts of the basic frame.

Colorants which may be present may be dyes as well as pigments. An exemplary advantage with using the colorant is that after applying the coating agent to the basic frame, it is easy to establish whether and at which locations on the surface of the basic frame any coating agent is already present.

By using tackifiers, the stickiness of the coating agent when hot is raised. In addition, coating agents solidify more quickly with what are known as tackifiers.

The invention will now be described in more detail with the aid of general examples formulations.

GENERAL EXAMPLE 1

20-70% by weight base wax and/or base wax portion (BW)
30-80% by weight synthetic wax (SW)
0-20% by weight other additives

General Example 2

35-65% by weight base wax portion (BW)
65-35% by weight synthetic wax (SW)
0-10% by weight other additives

Formulation Example 1—Coating Agent

40% by weight paraffin wax (BW)
60% by weight synthetic wax (SW)

Formulation Example 2—Coating Agent

28% by weight paraffin wax
30% by weight microwax
42% by weight synthetic wax

Formulation Example 3—Coating Agent

58% by weight microwax
37% by weight synthetic wax
5% by weight colorant, rheological additive and tackifier

Formulation Example—Lightweight Industrial Clay (prior art)

33% by weight paraffin wax+microwax
5% by weight white oil
45% by weight calcium stearate (filler)
16% by weight lightweight filler
2% by weight iron oxide as colorant In order to be able to establish and evaluate any improvement in the adhesion, tensile tests were carried out with a Zwick Universal Testing Machine. In this regard, the Lest piece is clamped at both ends. After the specimen has been clamped, the clamping system is spread apart at a defined speed and the maximum force, Fmax, which is necessary at the time for rupture of the test piece is measured.

In the case of the present subject matter of the application, the test piece consists of a layered model consisting of basic frame, coating agent and industrial clay, wherein the clamping points are formed by the basic frame on the one hand and the industrial clay on the other hand. The tensile tests were carried out at room temperature.

Fmax was determined, wherein an increase in Fmax is associated with an increase in the adhesive force.

The porous basic frame in the test was a porous foam body.

Dimensions or the test specimens: length 55 mm, width 10 mm and height 120 mm.

The present invention with an increase in adhesion between industrial clay and basic frame will now be illustrated in more detail with the aid of the tables below.

TABLE

Increase in adhesive force

| | Fmax |
|---|---|
| Inventive response, with coating agent according to Formulation Example 1, wherein the layer is applied with a brush and wherein the industrial clay application is carried out by machine | 209 N |
| Prior art response, specimen coated with shellac and clay applied using a manual method | 189 N |
| Prior art response, specimen coated with shellac and clay applied by machine | 21 N |

The method in accordance with the invention for the production of models or design models in automotive development will now be described in more detail.

The method is organised into the following procedural steps:

Step 1: providing a basic frame, preferably with a porous structure.

Step 2: applying a fused coating agent to the basic frame by means of a manual or machine application method, wherein at the time of application, the coating agent described above is at a temperature at which the base wax portion and the synthetic wax portion are fused.

Step 3: solidifying the coating agent on the surface of the basic frame by passive cooling at room temperature and/or active cooling by means of cooling systems such as with fans.

Step 4: applying at least one layer of industrial clay, wherein at the time of application, the industrial clay is at a temperature of approximately 60° C. to 120° C., preferably 70° C. to 100° C., wherein the application of the industrial clay is carried out manually, in a semi-automatic and/or in a fully automatic manner.

Optional step 5: fine processing/finishing of surface in order to perfect and/or adjust the design.

Use: the coating agent in accordance with the invention is used in the production of design models in automotive development, wherein the coating agent is configured as an intermediate layer between the porous basic frame and the industrial clay.

The invention claimed is:

1. A coating agent for clay-based automotive design modeling utilizing a porous basic frame and an industrial clay, the coating agent comprising: at least one wax; and optional further additives, wherein the at least one wax includes a base wax portion and a synthetic wax portion, and wherein the synthetic wax portion has a melting point that is greater/higher than a melting point of the base wax portion, wherein the base wax portion is microwax and/or paraffin wax and the base wax portion has a melting point of between 60° C. and 80° C. so that the at least one wax promotes adhesion between the porous basic frame and the industrial clay.

2. The coating agent according to claim 1, wherein the base wax portion is between 20 and 70% by weight and the synthetic wax portion is between 30 and 80% by weight.

3. The coating agent according to claim 1, wherein the synthetic wax portion is an ethylene propylene polymer, polyethylene wax and/or polyalphaolefin and the synthetic wax has a melting point of more than 80° C.

* * * * *